(12) United States Patent
Kutsuna et al.

(10) Patent No.: US 12,302,786 B2
(45) Date of Patent: May 20, 2025

(54) GROUNDING BODY AND GRASS CUTTER COMPRISING GROUNDING BODY

(71) Applicant: MAKITA CORPORATION, Anjo (JP)

(72) Inventors: Tomoyuki Kutsuna, Anjo (JP); Naoki Fujimatsu, Anjo (JP); Nozomu Iwamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 303 days.

(21) Appl. No.: 17/851,466

(22) Filed: Jun. 28, 2022

(65) Prior Publication Data

US 2022/0408639 A1 Dec. 29, 2022

(30) Foreign Application Priority Data

Jun. 29, 2021 (JP) .................................. 2021-107456
Dec. 24, 2021 (JP) .................................. 2021-210663

(51) Int. Cl.
*A01D 34/81* (2006.01)
*A01D 34/67* (2006.01)
*A01D 34/73* (2006.01)

(52) U.S. Cl.
CPC ............. *A01D 34/81* (2013.01); *A01D 34/67* (2013.01); *A01D 34/733* (2013.01)

(58) Field of Classification Search
CPC ...... A01D 34/81; A01D 34/67; A01D 34/733; A01D 34/416; A01D 34/82; A01D 44/4165; A01D 34/902; A01D 34/4166
USPC ........ 30/276, 329, 122, 333, 347, 255; 56/1, 56/12.7, 17.1, 16.5
See application file for complete search history.

(56) References Cited

U.S. PATENT DOCUMENTS

| 3,877,146 A * | 4/1975 | Pittinger ................ A01D 34/73 30/DIG. 5 |
| 4,242,797 A * | 1/1981 | Palmieri ............ A01D 34/4161 30/276 |
| 7,743,511 B2 * | 6/2010 | Jerez .................... A01D 34/416 30/329 |
| 2002/0170183 A1 * | 11/2002 | Sugihara .............. A01D 34/416 30/276 |

(Continued)

FOREIGN PATENT DOCUMENTS

| JP | 2008-035731 A | 2/2008 |
| JP | 2015-12850 A | 1/2015 |

(Continued)

OTHER PUBLICATIONS

Communication dated Mar. 11, 2025 in Japanese Application No. 2021-210663.

*Primary Examiner* — Ghassem Alie
(74) *Attorney, Agent, or Firm* — Sughrue Mion, PLLC

(57) ABSTRACT

A grounding body may be mounted on a cutting blade shaft of a grass cutter. The grounding body may include a mounting part for mounting the grounding body on the cutting blade shaft, wherein a cutting blade is mounted on the cutting blade shaft to be positioned above the grounding body; and a main body coupled to the mounting part and configured to contact a ground. The main body may include a first main body constituted of a first resin; and a second main body constituted of a second resin different from the first resin.

11 Claims, 7 Drawing Sheets

(56) References Cited

U.S. PATENT DOCUMENTS

| | | | | |
|---|---|---|---|---|
| 2008/0250653 A1* | 10/2008 | Arnetoli | ............. | A01D 34/4163 |
| | | | | 30/276 |
| 2009/0100815 A1* | 4/2009 | Kitamura | ............. | A01D 34/902 |
| | | | | 56/255 |
| 2015/0271996 A1* | 10/2015 | Ikeno | ................... | A01D 34/828 |
| | | | | 56/255 |
| 2021/0386014 A1* | 12/2021 | Rethaber | .............. | A01D 34/736 |

FOREIGN PATENT DOCUMENTS

| | | | | |
|---|---|---|---|---|
| WO | 2014/007688 A1 | 1/2014 | | |
| WO | WO-2016103117 A1 * | 6/2016 | ......... | A01D 34/4163 |

* cited by examiner

FIG. 7
(Fourth Embodiment)
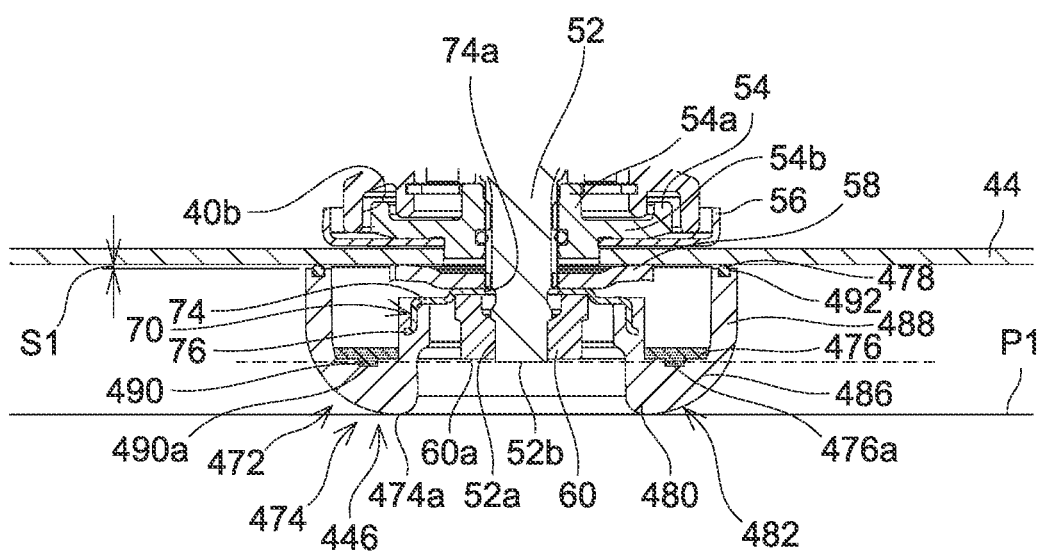
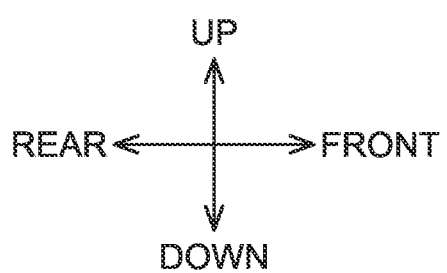

GROUNDING BODY AND GRASS CUTTER COMPRISING GROUNDING BODY

CROSS-REFERENCE TO RELATED APPLICATION

This application claims priority to Japanese Patent Application No. 2021-107456 filed on Jun. 29, 2021 and Japanese Patent Application No. 2021-210663 filed on Dec. 24, 2021, the contents of which are hereby incorporated by reference into the present application.

TECHNICAL FIELD

The art disclosed herein relates to a grounding body and a grass cutter comprising a grounding body.

BACKGROUND ART

Japanese Patent Application Publication No. 2008-35731 describes a grounding body. The grounding body comprises a mounting part and a main body. The mounting part is for mounting the grounding body on a cutting blade shaft and a cutting blade is mounted on the cutting blade shaft to be positioned above the grounding body. The main body is coupled to the mounting part and configured to contact a ground. The main body is constituted of one kind of resin.

SUMMARY

The main body of the grounding body in Japanese Patent Application Publication No. 2008-35731 is constituted of one kind of resin. Such main bodies constituted of one kind of resin have difficulty in improving the visual noticeability for a user and the quietness of the grass cutter on which the grounding body is mounted.

The disclosure herein provides a novel and useful structure regarding a grounding body mounted on a cutting blade shaft of a grass cutter.

The disclosure herein discloses a grounding body mounted on a cutting blade shaft of a grass cutter. The grounding body may comprise a mounting part for mounting the grounding body on the cutting blade shaft, wherein a cutting blade is mounted on the cutting blade shaft to be positioned above the grounding body, and a main body coupled to the mounting part and configured to contact a ground, wherein the main body may comprise: a first main body constituted of a first resin; and a second main body constituted of a second resin different from the first resin.

According to the configuration above, the main body comprises the first main body constituted of the first resin and the second main body constituted of the second resin. Compared with a main body constituted of a single kind of resin, the main body constituted of two kinds of resins improves the visual noticeability for a user and the quietness of the grass cutter. In the disclosure herein, the term "resin" is a concept including not only plastic having relatively high hardness but also thermosetting elastomer and thermoplastic elastomer having lower hardness and gum.

The disclosure herein also discloses a grass cutter. The grass cutter may comprise: an operation rod; a cutting blade shaft disposed on a front portion of the operation rod; a cutting blade mounted on the cutting blade shaft; and a grounding body mounted on the cutting blade shaft and configured to contact a ground, wherein the cutting blade is positioned above the grounding body, wherein the grounding body may comprise: a mounting part for mounting the grounding body on the cutting blade shaft, and a main body coupled to the mounting part and configured to contact the ground, the main body may comprise: a first main body constituted of a first resin; and a second main body constituted of a second resin different from the first resin.

According to the configuration above, the main body of the grounding body comprises the first main body constituted of the first resin and the second main body constituted of the second resin. Compared with a main body constituted of a single kind of resin, the main body constituted of two kinds of resins improves the visual noticeability for a user and the quietness of the grass cutter.

BRIEF DESCRIPTION OF THE DRAWINGS

FIG. 7 is a sectional right-side view of a grounding body 446 of a fourth embodiment.

DETAILED DESCRIPTION

Figure 1:
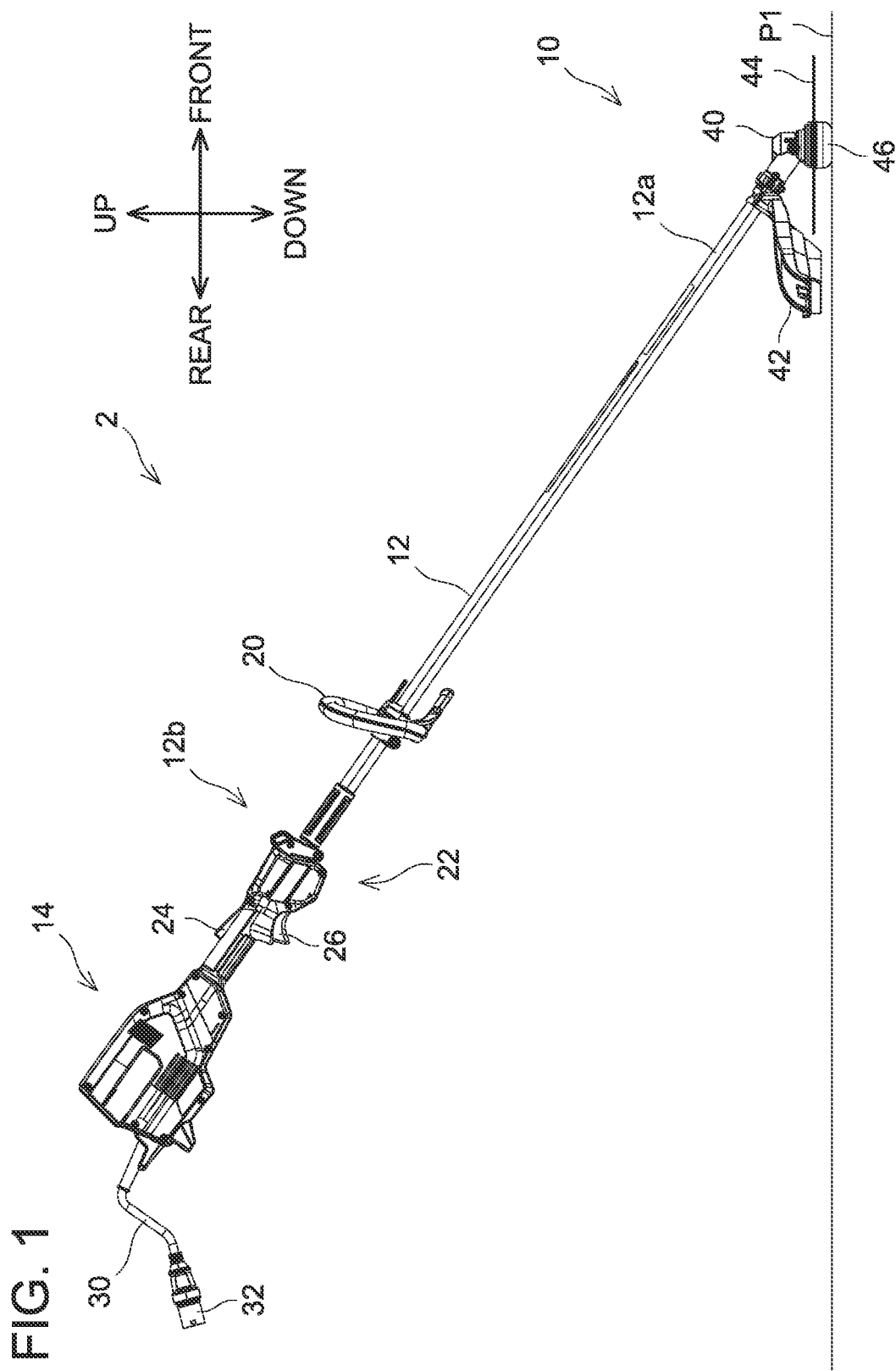
FIG. 1 is a right-side view of a grass cutter 2 of a first embodiment.

Representative, non-limiting examples of the disclosure herein will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved grounding bodies and grass cutters, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a grounding body may comprise: a mounting part for mounting the grounding body on the cutting blade shaft, wherein a cutting blade is mounted on the cutting blade shaft to be positioned above the grounding body; and a main body coupled to the mounting part and configured to contact a ground, wherein the main body may comprise: a first main body constituted of a first resin, and a second main body constituted of a second resin different from the first resin.

In one or more embodiments, the grounding body may be mounted on the cutting blade shaft by a nut member. The mounting part may comprise a through hole through which the cutting blade shaft passes, and a color of the first resin may be different from a color of the second resin. A lower end of the second main body may be positioned below a lower end of the cutting blade shaft and a lower end of the nut number, and a lower end of the first main body may be positioned below the lower end of the second main body.

Over the use of the grass cutter, the main body, which is configured to contact the ground, gets worn. As the wear of the main body progresses, the cutting blade shaft or the nut member eventually comes to contact the ground. Especially, once an outer surface of the nut member has worn, the nut member may not be easily detached with a tool. That is, the grounding body and the cutting blade may not be replaced easily. Hence, it is desirable that the grounding body is replaced before the cutting blade shaft or the nut member contacts the ground. According to the configuration above, the lower end of the second main body is positioned below the lower end of the cutting blade shaft and the lower end of the nut member, and the lower end of the first main body is positioned below the lower end of the second main body. Additionally, the color of the first resin is different from that of the second resin. A user can thus easily notice the border between the first main body and the second main body when the second main body is exposed as a result of the wear of the first main body. Therefore, the user can replace the grounding body when the lower end of the second main body is exposed, i.e., before the cutting blade shaft or the nut member contacts the ground. Consequently, the wear of the cutting blade shaft and the nut member can be suppressed.

In one or more embodiments, an outer surface of the first main body may be configured to contact the ground, and the second main body may be disposed on an inner surface of the first main body.

According to the configuration above, the second main body, which is disposed on the inner surface of the first main body, is exposed as a result of the wear of the first main body, before the cutting blade shaft or the nut member contacts the ground. Thus, the user can suppress the wear of the cutting blade shaft and the nut member, by replacing the grounding body when he/she visibly notices the exposed second main body.

In one or more embodiments, a recess may be defined in the inner surface of the first main body, a lower end of the recess may be positioned below the lower end of the cutting blade shaft and the lower end of the nut member, and the second main body may be disposed in the recess.

According to the configuration above, the second main body, which is disposed in the recess defined in the inner surface of the first main body, is exposed as a result of the wear of the first main body, before the cutting blade shaft and the nut member contact the ground. Thus, the user can suppress the wear of the cutting blade shaft and the nut member, by replacing the grounding body when he/she notices the exposed second main body.

In one or more embodiments, the second main body may be disposed on an upper surface of the first main body.

According to the configuration above, the border between the first main body and the second main body disappears as a result of the wear of the first main body, before the cutting blade shaft and the nut member contact the ground. Thus, the user can replace the grounding body when he/she comes to be unable to visibly notice the border between the first main body and the second main body. Consequently, the wear of the outer surface of the nut member can be suppressed.

In one or more embodiments, the main body may further comprise a third main body constituted of a third resin different from the first resin and the second resin. The third resin may be more elastically deformable than the first resin and the second resin. The third main body may abut a lower surface of the cutting blade.

Generally, a main body constituted of resin(s) abuts (i.e., contacts) the lower surface of cutting blade constituted of metal. Thus, a clank is caused by rotation of the cutting blade since the main body of the grounding body contacts the cutting blade. A configuration in which a member constituted of a more elastically deformable resin contacts the lower surface of the cutting blade can reduce the clank compared with a configuration in which a member constituted of a less elastically deformable resin contacts the lower surface of the cutting blade. According to the configuration above, the third main body constituted of the third resin, which is more elastically deformable than the first resin and the second resin, abuts the lower surface of the cutting blade. The clank can thus be reduced while the grass cutter is working. Consequently, the quietness of the grass cutter can be improved.

In one or more embodiments, the first main body may comprise: a cylindrical portion coupled to the mounting part; and a flange portion extending radially outward from a lower end of the cylindrical portion. The third main body may be disposed on an upper surface of the flange portion.

According to the configuration above, the upper surface of the flange portion which is constituted of the first resin can be prevented from abutting the lower surface of the cutting blade. That is, it is ensured that the first main body constituted of the first resin is prevented from abutting the lower surface of the cutting blade. Thus, it is ensured that the clank can be reduced while the cutting blade is rotating.

In one or more embodiments, the third main body may be configured separately from the first main body and the second main body. A recess having a downwardly recessed shape may be defined in an upper surface of the flange portion. The third main body may be disposed in the recess. An upper end of the third main body may be positioned above an upper end of the flange portion.

In the configuration in which the third main body is configured separately from the first main body and the second main body, the third main body needs to be disposed on the upper surface of the flange portion in order to make the third main body abuts the lower surface of the cutting blade. In this case, to prevent the third main body from separating from the upper surface of the flange portion while the cutting blade is rotating, the third main body needs to be fixed on the upper surface of the flange portion by adhesion, welding, and/or other method(s). According to the configuration above, the third main body is disposed in the recess defined in the upper surface of the flange portion. Thus, the third main body can be prevented from separating from the upper surface of the flange portion while the cutting blade is rotating, without fixing the third main body on the upper surface of the flange portion by adhesion, welding and/or other method(s). Consequently, the structure of the main body can be simplified.

In one or more embodiments, the second resin may be more elastically deformable than the first resin. The second main body may abut a lower surface of the cutting blade.

According to the configuration above, the second main body constituted of the second resin, which is more elastically deformable than the first resin, abuts the lower surface of the cutting blade. The clank thus can be reduced while the grass cutter is working. Consequently, the quietness of the grass cutter can be improved.

In one or more embodiments, the first main body may comprise: a cylindrical portion coupled to the mounting part; and a flange portion extending radially outward from a lower end of the cylindrical portion. The second main body may be disposed on an upper surface of the flange portion.

According to the configuration above, the upper surface of the flange portion, which is constituted of the first resin, can be prevented from abutting the lower surface of the cutting blade. That is, it is ensured that the first main body constituted of the first resin is prevented from abutting the lower surface of the cutting blade. Thus, it is ensured that the clank can be reduced while the cutting blade is rotating.

In one or more embodiments, the second main body may be disposed on an inner surface of the flange portion.

According to the configuration above, the inner surface of the flange portion, which is constituted of the first resin, can be prevented from abutting the lower surface of the cutting blade. That is, it is ensured that the first main body constituted of the first resin can be prevented from abutting the lower surface of the cutting blade. Thus, it is ensured that the clank can be reduced while the cutting blade is rotating.

In one or more embodiments, the second main body may be configured separately from the first main body. A recess having a downwardly recessed shape may be defined in an upper surface of the flange portion. The second main body may be disposed in the recess. An upper end of the second main body may be positioned above an upper end of the flange portion.

In the configuration in which the second main body is configured separately from the first main body, the second main body needs to be disposed on the upper surface of the flange portion in order to make the second main body abuts the lower surface of the cutting blade. In this case, to prevent the second main body from separating from the upper surface of the flange portion while the cutting blade is rotating, the second body needs to be fixed on the upper surface of the flange portion by adhesion, welding and/or other method(s). According to the configuration above, the second main body is disposed in the recess defined in the upper surface of the flange portion. Thus, the second main body can be prevented from separating from the upper surface of the flange portion while the cutting blade is rotating, without fixing the second main body on the upper surface of the flange portion by adhesion, welding and/or other method(s). Consequently, the structure of the main body can be simplified.

First Embodiment

Figure 2:
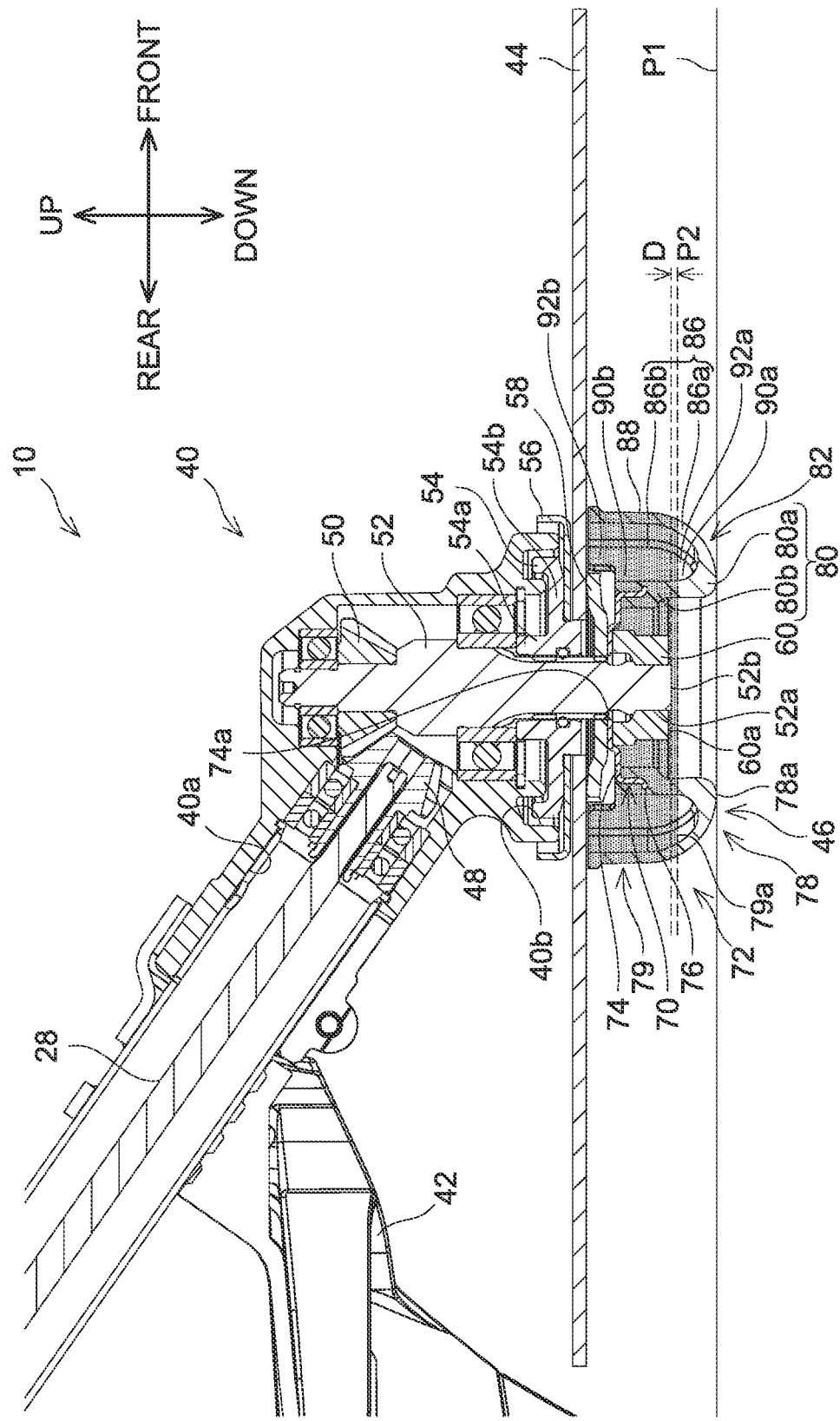
FIG. 2 is a sectional right-side view of a grounding body 46 of the first embodiment.
Figure 3:
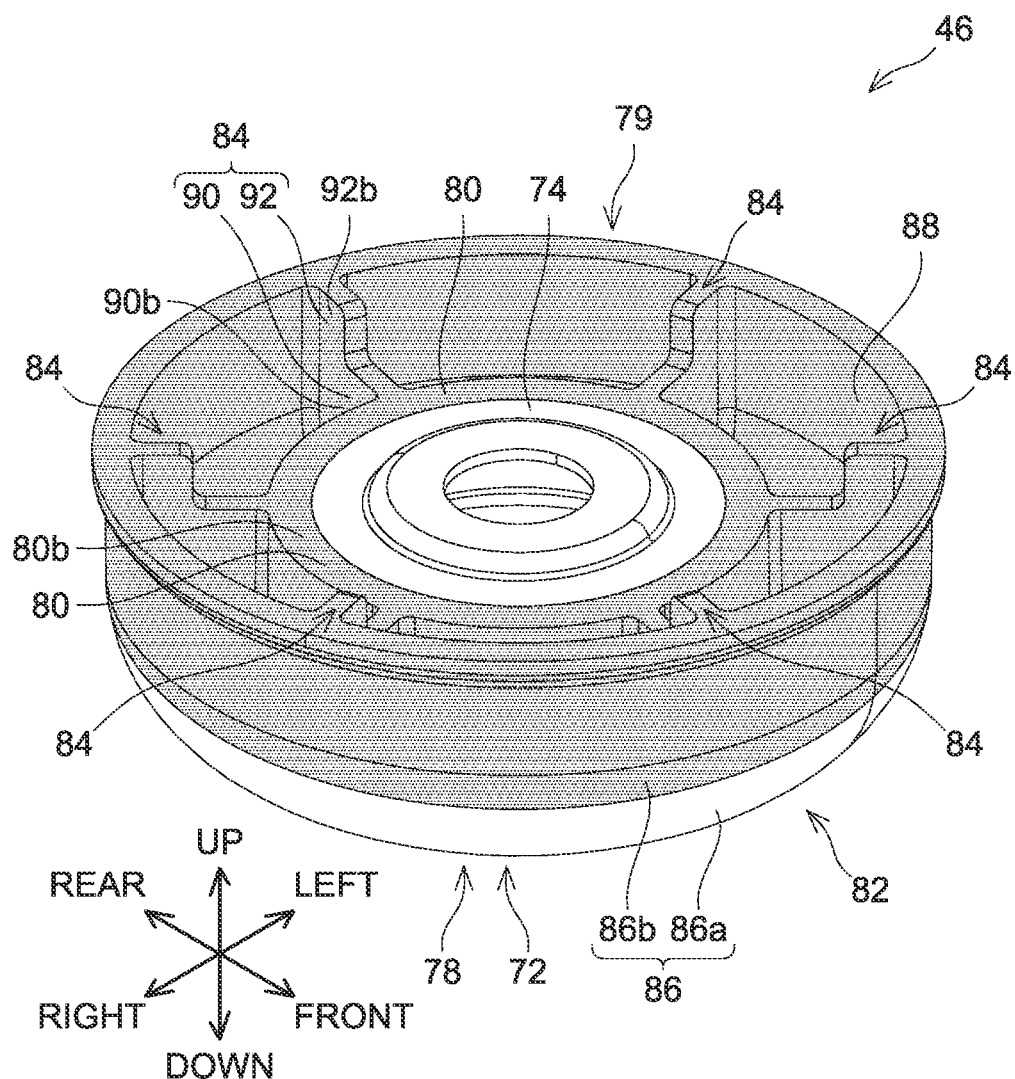
FIG. 3 is a perspective view of the grounding body 46 of the first embodiment viewed from the upper-front-right side.

Referring to FIG. 1 to FIG. 3, a grass cutter 2 of a first embodiment will be described. As illustrated in FIG. 1, the grass cutter 2 comprises a cutting blade unit 10, an operation rod 12 and a rear housing 14. Hereinafter, a direction vertical to a ground P1 shown in FIG. 1 may be termed an up-down direction, a direction orthogonal to the up-down direction in FIG. 1 may be termed a front-rear direction, and a direction orthogonal to both the up-down direction and the front-rear direction may be termed a left-right direction.

The cutting blade unit 10 is disposed on a front portion 12a of the operation rod 12. The rear housing 14 is disposed on a rear portion 12b of the operation rod 12. The operation rod 12 extends rearward and upward from the cutting blade unit 10. The operation rod 12 connects the cutting blade unit 10 to the rear housing 14.

The operation rod 12 has a shape of a hollow pipe and extends linearly. A loop handle 20 for a user to grip is disposed on the operation rod 12. A grip 22 is disposed between the loop handle 20 of the operation rod 12 and the rear housing 14. The grip 22 is formed to cover an outer circumference of the operation rod 12. The grip 22 comprises a lock-off lever 24 disposed on an upper surface of the grip 22 and a drive switch 26 disposed on a lower surface of the grip 22. The lock-off lever 24 is a lever used to restrict a push-in operation on the drive switch 26 and release the restriction. The drive switch 26 is a switch for driving a motor (not shown and will be described later). A supply of electric power to the motor is cut off when the drive switch 26 is not pushed in. Electric power is supplied to the motor when the drive switch 26 is pushed in. The push-in operation on the drive switch 26 is restricted when the lock-off lever 24 is not pushed in. The restriction on the push-in operation on the drive switch 26 is released when the lock-off lever 24 is pushed in. A transmission shaft 28 (see FIG. 2) that rotates by the driving of the motor is rotatably housed in the operation rod 12.

The rear housing 14 houses the motor (not shown) and a control board (not shown). The motor may be a brushless direct current motor, a brushed direct current motor, or a motor of other type such as an alternating current motor. As a variant, an engine may be housed in the rear housing 14. The control board controls the operation of the motor. A rear portion of the rear housing 14 is connected to an end of a power cable 30. A connector 32 is disposed at the other end of the power cable 30. The connector 32 is connected to a power cable extending from an external power supply such as a battery (not shown). The motor operates by electric power supplied through the power cable 30.

As shown in FIG. 1 and FIG. 2, the cutting blade unit 10 comprises a gear housing 40, a safety cover 42, a cutting blade 44 and a grounding body 46. The cutting blade 44 comprises two cutting blades that respectively extends forward and rearward. The cutting blade 44 is constituted of metal. As a variant, the cutting blade 44 may comprise four cutting blades, eight cutting blades, or a disk-shape chip saw. As another variant, the cutting blade 44 may be a nylon cord. As shown in FIG. 2, an insertion hole 40a to which the front portion 12a of the operation rod 12 is inserted is defined in an upper rear portion of the gear housing 40. The gear housing 40 houses a first gear 48, a second gear 50 and a cutting blade shaft 52. The transmission shaft 28 is mounted on the first gear 48. The cutting blade shaft 52 is mounted on the second gear 50. The first gear 48 meshes with the second gear 50. The first gear 48 and the second gear 50 are bevel gears.

An opening 40b is defined in a lower portion of the gear housing 40. The cutting blade unit 10 further comprises a transmission part 54, an upper metal component 56, a lower metal component 58 and a nut member 60. The transmission part 54 is disposed in the opening 40b. The transmission part 54 comprises a cylindrical portion 54a and a disk portion 54b extending radially outward from the cylindrical portion 54a. The cylindrical portion 54a of the transmission part 54 is detachably mounted on the cutting blade shaft 52. The upper metal component 56 is disposed below a lower surface of the disk portion 54b of the transmission part 54. The cutting blade 44 is disposed below a lower surface of the upper metal component 56. The lower metal component 58 is disposed below a lower surface of the cutting blade 44. The nut member 60 is engaged with a threaded portion 52a formed at a lower portion of the cutting blade shaft 52. A mounting part 70 of the grounding body 46 (to be described later) is disposed between the nut member 60 and the lower metal component 58. A lower end 52b of the cutting blade shaft 52 is positioned below a lower end 60a of the nut member 60. By tightening the nut member 60, the cutting blade 44 is held between the upper metal component 56 and the lower metal component 58. When the cutting blade shaft 52 rotates in that state, the transmission part 54, the upper metal component 56, the lower metal component 58, the nut member 60, the grounding body 46, and the cutting blade 44 rotate integrally.

Referring to FIG. 1 to FIG. 4, the grounding body 46 will be described. The grounding body 46 comprises the mounting part 70 and a main body 72. The mounting part 70 comprises a disk portion 74 and a coupling portion 76. A central portion of the disk portion 74 projects upward. A through hole 74a is defined in the central portion of the disk portion 74. The disk portion 74 is disposed between the lower metal component 58 and the nut member 60. The coupling portion 76 is coupled with the main body 72.

Figure 4:
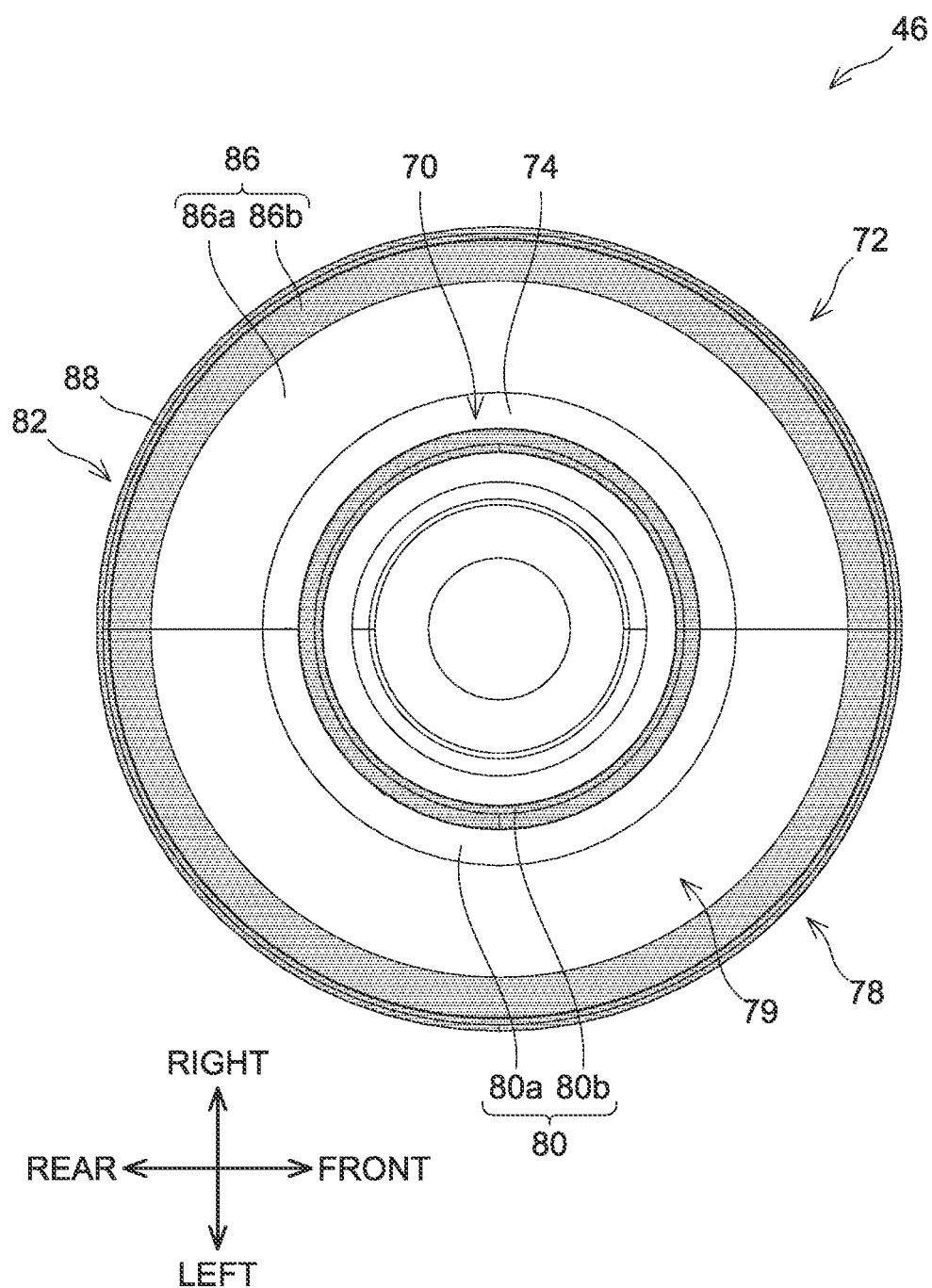
FIG. 4 is a top view of the grounding body 46 of the first embodiment.

Next, the main body 72 will be described. The grounding body 46 of this embodiment is formed by two-color molding. The main body 72 is constituted of a first resin having a first color and a second resin having a second color. For example, the first color is "black" and the second color is "grey", although the first color and the second color are not particularly limited. The material quality of the first resin may be same as or different from that of the second resin. In FIG. 2 to FIG. 4, to clarify the color difference between the first resin and the second resin, portions constituted of the first resin having the first color are shown in "white", and portions constituted of the second resin having the second color are shown in "grey". After the overall shape of the main body 72 is described, the portions constituted of the first resin and the portions constituted of the second resin of the main body 72 will be described.

As shown in FIG. 3 and FIG. 4, the main body 72 comprises an inner cylindrical portion 80, a flange portion 82, and six rib portions 84. As shown in FIG. 2, an inner diameter of the inner cylindrical portion 80 is larger than an outer diameter of the nut member 60. The coupling portion 76 of the mounting part 70 is coupled to an upper portion of the inner cylindrical portion 80. The flange portion 82 comprises a curve portion 86 extending radially outward from a lower end of the inner cylindrical portion 80 and an outer cylindrical portion 88 extending upward from an outer edge of the curve portion 86. The curve portion 86 curves such that its portions closer to the outer edge are positioned above portions farther from the outer edge. An upper surface of the outer cylindrical portion 88 abuts the lower surface of the cutting blade 44. As shown in FIG. 3, each of the rib portions 84 comprises an inner rib portion 90 and an outer rib portion 92. Each inner rib portion 90 extends radially outward from an outer surface of the inner cylindrical portion 80. An upper surface of each inner rib portion 90 is at the same height as an upper surface of the inner cylindrical portion 80. Each outer rib portion 92 extends radially outward from a radially outward end of the corresponding inner rib portion 90. Each outer rib portion 92 is connected to an inner surface of the outer cylindrical portion 88. An upper surface of each outer rib portion 92 is at the same height as an upper surface of the outer cylindrical portion 88.

Next, the portions constituted of the first resin and the portions constituted of the second resin of the main body 72 will be described. Hereinafter, the portions constituted of the first resin and the portions constituted of the second resin will be respectively termed a "first main body 78" and a "second main body 79". As shown in FIG. 2, a plane P2 is a plane along the front-rear direction and the left-right direction, and the first main body 78 is a part of the main body 72 that is positioned below the plane P2 and the second main body 79 is a part of the main body 72 that is positioned above the plane P2. In the up-down direction, the plane P2 is positioned below the lower end 52b of the cutting blade shaft 52 by a distance D.

As shown in FIG. 2, the inner cylindrical portion 80 comprises a first inner cylindrical portion 80a positioned below the plane P2 and a second inner cylindrical portion 80b positioned above the plane P2. Thus, the first inner cylindrical portion 80a is constituted of the first resin and the second inner cylindrical portion 80b is constituted of the second resin. Besides, the curve portion 86 of the flange portion 82 comprises a first curve portion 86a positioned below the plane P2 and a second curve portion 86b positioned above the plane P2. Thus, the first curve portion 86a is constituted of the first resin and the second curve portion 86b is constituted of the second resin. Additionally, the outer cylindrical portion 88 of the flange portion 82 is positioned above the plane P2. Thus, the outer cylindrical portion 88 is constituted of the second resin only. Moreover, each inner rib portion 90 comprises a first inner rib portion 90a positioned below the plane P2 and a second inner rib portion 90b positioned above the plane P2. Thus, the first inner rib portions 90a are constituted of the first resin and the second inner rib portions 90b are constituted of the second resin. Furthermore, each outer rib portion 92 comprises a first outer rib portion 92a positioned below the plane P2 and a second outer rib portion 92b positioned above the plane P2. Thus, the first outer rib portions 92a are constituted of the first resin and the second outer rib portions 92b are constituted of the second resin. Thus, the first main body 78 comprises the first inner cylindrical portion 80a, the first curve portion 86a, the first inner rib portions 90a, and the first outer rib portions 92a. Similarly, the second main body 79 comprises the second inner cylindrical portion 80b, the second curve portion 86b, the outer cylindrical portion 88, the second inner rib portions 90b, and the second outer rib portions 92b. In this embodiment, the second main body 79 is disposed on an upper surface of the first main body 78. Further, a lower end 79a of the second main body 79 is positioned below the lower end 52b of the cutting blade shaft 52 and the lower end 60a of the nut member 60. Moreover, a lower end 78a of the first main body 78 is positioned below the lower end 79a of the second main body 79.

In one or more embodiments, as shown in FIG. 1 and FIG. 2, the grounding body 46 comprises the mounting part 70 for mounting the grounding body 46 on the cutting blade shaft 52 and the main body 72 coupled to the mounting part 70 and configured to contact the ground P1. The cutting blade 44 is positioned above the grounding body 46 on the cutting blade shaft 52. The main body 72 comprises the first main body 78 constituted of the first resin and the second main body 79 constituted of the second resin different from the first resin. Compared with a configuration in which the main body 72 is constituted of a single kind of resin, the configuration in which the main body 72 is constituted of two kinds of resins improves the visual noticeability for the user and the quietness of the grass cutter 2.

In one or more embodiments, as shown in FIG. 2, the grounding body 46 is mounted on the cutting blade shaft 52 by the nut member 60. The mounting part 70 comprises the through hole 74a through which the cutting blade shaft 52 passes. The color of the first resin is different from the color of the second resin. The lower end 79a of the second main body 79 is positioned below the lower end 52b of the cutting blade shaft 52 and the lower end 60a of the nut member 60, and the lower end 78a of the first main body 78 is positioned below the lower end 79a of the second main body 79. Over the use of the grass cutter 2, the main body 72 of the grounding body 46, which is configured to contact the ground P1, gets worn. As the wear of the main body 72 progresses, the cutting blade shaft 52 or the nut member 60 eventually comes to contact the ground P1. Especially, once an outer surface of the nut member 60 has worn, the nut member 60 cannot be detached easily with a tool. That is, the grounding body 46 and the cutting blade 44 cannot be replaced easily. Hence, it is desirable that the grounding body 46 is replaced before the cutting blade shaft 52 or the nut member 60 contacts the ground P1. According to the configuration above, the lower end 79a of the second main body 79 is positioned below the lower end 52b of the cutting blade shaft 52 and the lower end 60a of the nut member 60, and the lower end 78a of the first main body 78 is positioned below the lower end 79a of the second main body 79. Additionally, the color of the first resin is different from that of the second resin. The user can thus easily notice the border between the first main body 78 and the second main body 79 when the lower end 79a of the second main body 79 is exposed as a result of the wear of the first main body 78. Therefore, the user can replace the grounding body 46 when the lower end 79a of the second main body 79 is exposed, i.e., before the cutting blade shaft 52 or the nut member 60 contacts the ground P1. Consequently, the wear of the outer surface of the nut member 60 can be suppressed.

In one or more embodiments, as shown in FIG. 2, the second main body 79 is disposed on the upper surface of the first main body 78. According to this configuration, the border between the first main body 78 and the second main body 79 disappears when the wear of the first main body 78 has progressed up to the upper surface of the first main body 78. The user can thus replace the grounding body 46 when the border between the first main body 78 and the second main body 79 becomes visually unnoticeable. Thus, the wear of the outer surface of the nut member 60 can be suppressed.

In one or more embodiments, as shown in FIG. 1 to FIG. 4, the grass cutter 2 comprises the operation rod 12, the cutting blade shaft 52 disposed on the front portion 12a of the operation rod 12, the cutting blade 44 mounted on the cutting blade shaft 52, and the grounding body 46 mounted on the cutting blade shaft 52 below the cutting blade 44 and configured to contact the ground P1. The grounding body 46 comprises the mounting part 70 for mounting the grounding body 46 on the cutting blade shaft 52 and the main body 72 coupled to the mounting part 70 and configured to contact the ground P1. The main body 72 comprises the first main body 78 constituted of the first resin and the second main body 79 constituted of the second resin different from the first resin. Compared with a configuration in which the main body 72 is constituted of a single kind of resin, the configuration in which the main body 72 of the grounding body 46 is constituted of two kinds of resins improves the visual noticeability for the user and the quietness of the grass cutter 2.

Second Embodiment

Figure 5:
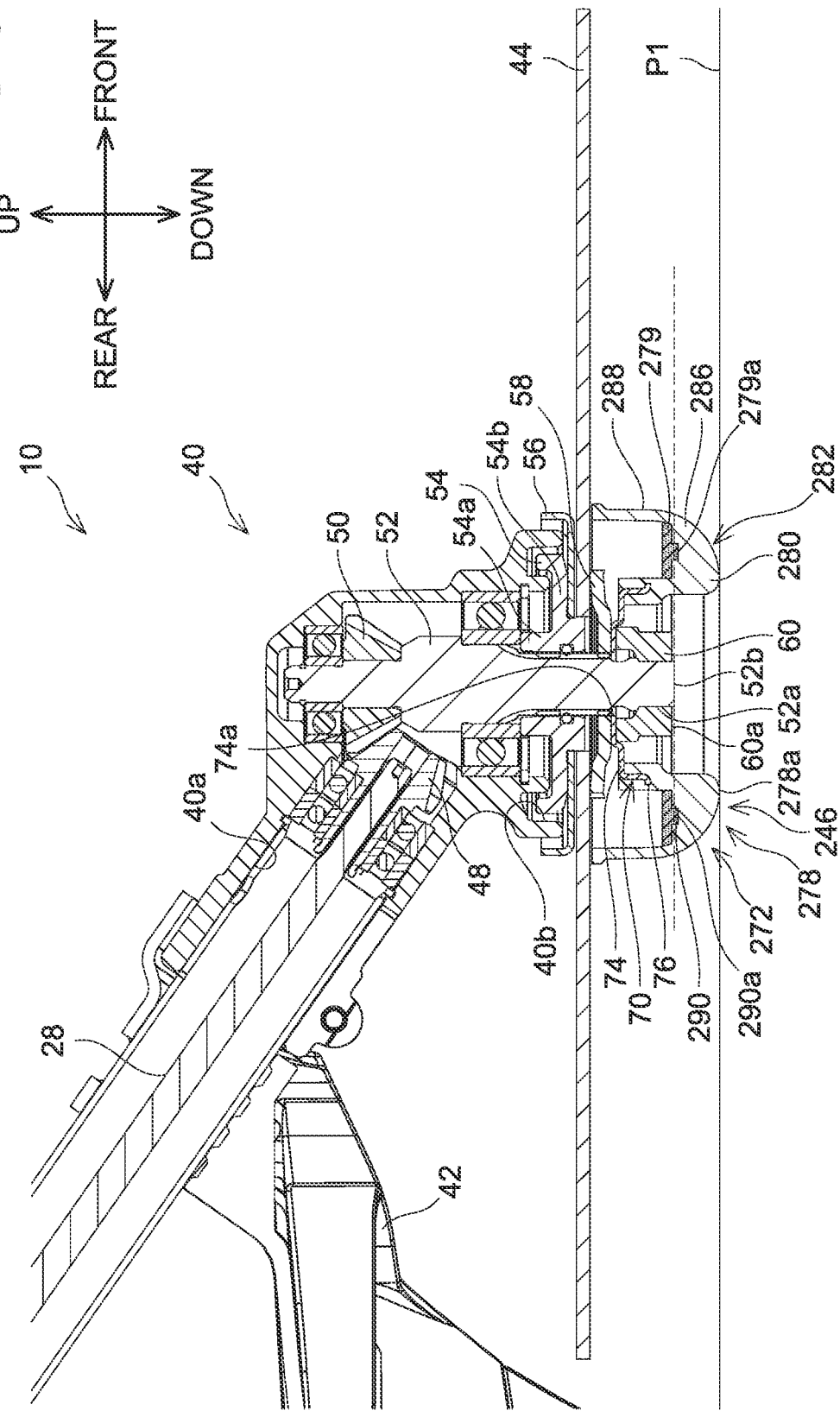
FIG. 5 is a sectional right-side view of a grounding body 246 of a second embodiment.

Referring to FIG. 5, a grounding body 246 of a second embodiment will be described. For common elements among embodiments, the same reference numerals are used and descriptions for those elements will be omitted.

As shown in FIG. 5, the grounding body 246 comprises the mounting part 70 and a main body 272. As with the main body 72 of the first embodiment, the main body 272 of this embodiment is formed by two-color molding as well. That is, the main body 272 is constituted of a first resin having a first color and a second resin having a second color. The main body 272 comprises a first main body 278 constituted of the first resin and a second main body 279 constituted of the second resin.

The first main body 278 comprises an inner cylindrical portion 280 and a flange portion 282. The inner cylindrical portion 280 has the same shape as that of the inner cylindrical portion 80 of the first embodiment (see FIG. 2). The flange portion 282 comprises a curve portion 286 extending radially outward from a lower end of the inner cylindrical portion 280 and an outer cylindrical portion 288 extending upward from an outer edge of the curve portion 286. The outer cylindrical portion 288 has the same shape as that of the outer cylindrical portion 88 of the first embodiment (see FIG. 2). The curve portion 286 has the same outer shape as that of the curve portion 86 of the first embodiment (see FIG. 2). A recess 290 that is downwardly recessed is defined in an upper surface of the curve portion 286. A lower end 290a of the recess 290 is positioned below the lower end 52b of the cutting blade shaft 52 and the lower end 60a of the nut member 60.

The second main body 279 is disposed on an inner surface of the first main body 278 (specifically, an outer surface of the inner cylindrical portion 280, the upper surface of the curve portion 286 and an inner surface of the outer cylindrical portion 288). Besides, the second main body 279 is disposed in the recess 290 defined in the upper surface of the curve portion 286. A lower end 279a of the second main body 279 is positioned below the lower end 52b of the cutting blade shaft 52 and the lower end 60a of the nut member 60. Additionally, a lower end 278a of the first main body 278 is positioned below the lower end 279a of the second main body 279.

In one or more embodiments, as shown in FIG. 5, an outer surface of the flange portion 282 of the first main body 278 contacts the ground P1 and the second main body 279 is disposed on an inner surface of the flange portion 282 of the first main body 278 (specifically, the upper surface of the curve portion 286 and the inner surface of the outer cylindrical portion 288). According to this configuration, the second main body 279 disposed on the inner surface of the first main body 278 is exposed as a result of the wear of the first main body 278, before the cutting blade shaft 52 or the nut member 60 contact the ground P1. Thus, the user can suppress the wear of the outer surface of the nut member 60 by replacing the grounding body 246 when he/she visually notices the exposed second main body 279.

In one or more embodiments, as shown in FIG. 5, the recess 290 is defined in the inner surface of the flange portion 282 of the first main body 278 (specifically, the upper surface of the curve portion 286). The lower end 290a of the recess 290 is positioned below the lower end 52b of the cutting blade shaft 52 and the lower end 60a of the nut member 60. The second main body 279 is disposed in the recess 290. According to this configuration, the second main body 279 disposed in the recess 290 is exposed as the wear of the first main body 278 progresses. Thus, the user can suppress the wear of the outer surface of the nut member 60 by replacing the grounding body 246 when he/she visually notices the exposed second main body 279.

Third Embodiment

Figure 6:
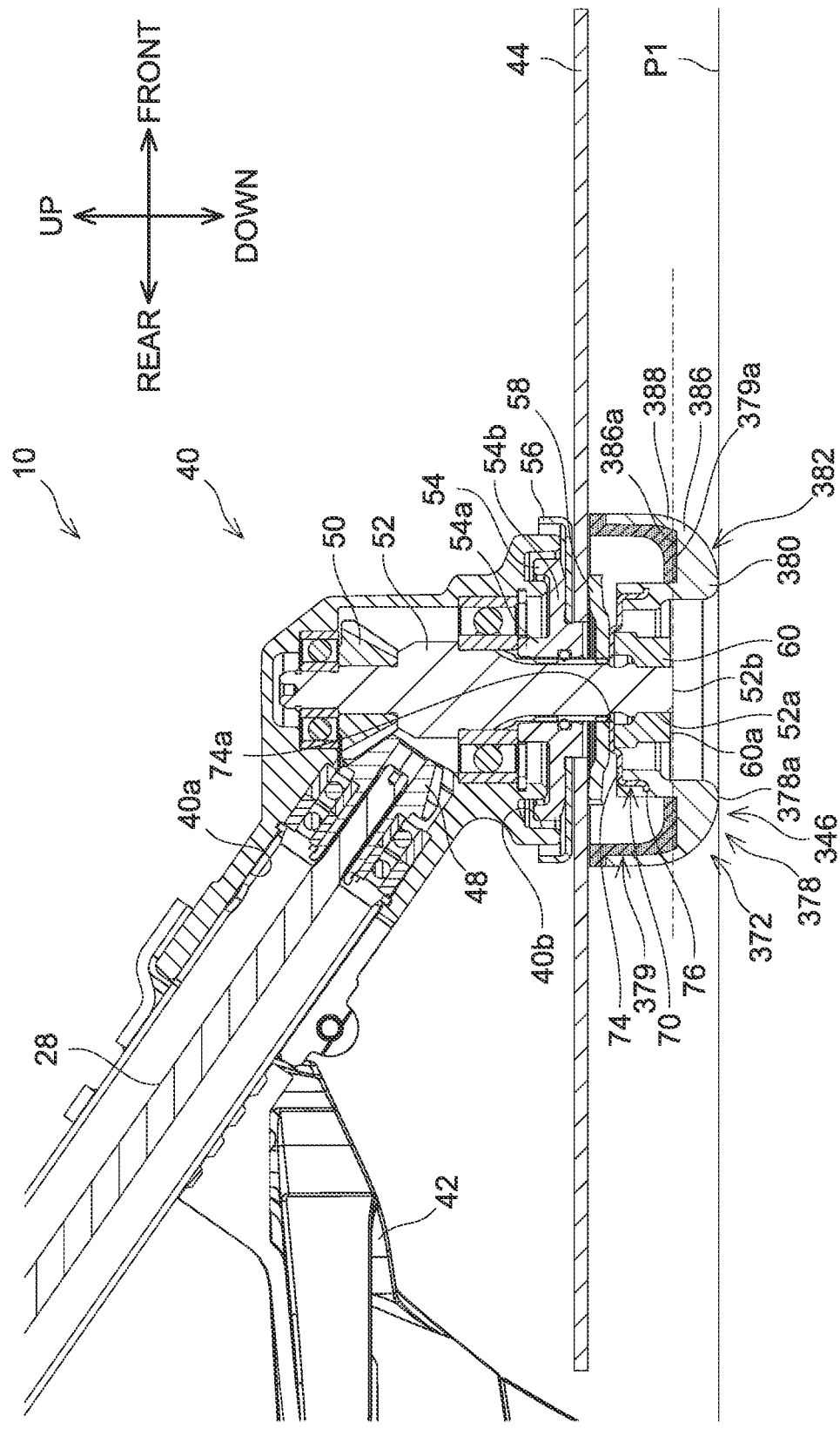
FIG. 6 is a sectional right-side view of a grounding body 346 of a third embodiment.

Referring to FIG. 6, a grounding body 346 of a third embodiment will be described. The grounding body 346 comprises the mounting part 70 and a main body 372. The main body 372 of this embodiment is formed by two-color molding as well. In this embodiment, the main body 372 comprises a first main body 378 constituted of a first resin and a second main body 379 constituted of a second resin. The second resin is more elastically deformable than the first resin. For example, the second resin (i.e., the second main body 379) has a smaller Young's modulus than the first resin (i.e., the first main body 379). The first resin is, for example, a resin comprising PA6, and the second resin is, for example, a resin comprising thermoplastic polyurethane (e.g., TPU, urethane resin).

The first main body 378 comprises an inner cylindrical portion 380 and a flange portion 382. The inner cylindrical portion 380 has the same shape as that of the inner cylindrical portion 80 of the first embodiment (see FIG. 2). The flange portion 382 comprises a curve portion 386 extending radially outward from a lower end of the inner cylindrical portion 380 and an outer cylindrical portion 388 extending upward from an outer edge of the curve portion 386. An upper surface of the outer cylindrical portion 388 does not abut the lower surface of the cutting blade 44. The curve portion 386 has the same outer shape as that of the curve portion 86 of the first embodiment (see FIG. 2). An upper end 386a of the curve portion 386 is positioned below the lower end 52b of the cutting blade shaft 52 and the lower end 60a of the nut member 60.

The second main body 379 is disposed on an outer surface of the inner cylindrical portion 380, an upper surface of the curve portion 386, an inner surface of the outer cylindrical portion 388 and the upper surface of the outer cylindrical portion 388. An upper surface of the second main body 379 abuts the lower surface of the cutting blade 44. Besides, a lower end 379a of the second main body 379 is positioned below the lower end 52b of the cutting blade shaft 52 and the lower end 60a of the nut member 60. Additionally, a lower end 378a of the first main body 378 is positioned below the lower end 379a of the second main body 379.

In one or more embodiments, the material quality of the first resin is different from that of the second resin and the second resin is more elastically deformable than the first resin. As shown in FIG. 6, the second main body 379 abuts the lower surface of the cutting blade 44. The configuration in which a member constituted of a relatively elastically deformable resin contacts the lower surface of the cutting blade 44 can reduce a clank, compared with a configuration in which a member constituted of a less elastically deformable resin contacts the lower surface of the cutting blade 44. According to the configuration above, the second main body 379 constituted of the second resin, which is relatively more elastically deformable, abuts the lower surface of the cutting blade 44. The clank can thus be reduced while the grass cutter 2 is working. Consequently, the quietness of the grass cutter 2 can be improved. With the object of reducing the clank, it suffices that the second main body 379 at least abuts the lower surface of the cutting blade 44, and the second main body 379 may not comprise the lower end 379a nor a portion along the outer cylindrical portion 388.

In one or more embodiments, as shown in FIG. 6, the first main body 378 comprises the inner cylindrical portion 380 coupled to the mounting part 70 and the flange portion 382 extending radially outward from the lower end of the inner cylindrical portion 380. The second main body 379 is disposed on an upper surface of the flange portion 382. According to this configuration, the upper surface of the flange portion 382 constituted of the first resin can be prevented from abutting the lower surface of the cutting blade 44. That is, it is ensured that the first main body 378 constituted of the first resin is prevented from abutting the lower surface of the cutting blade 44. Thus, it is ensured that the clank is reduced while the cutting blade 44 is rotating.

In one or more embodiments, as shown in FIG. 6, the second main body 379 is disposed on an inner surface of the flange portion 382. According to this configuration, the inner surface of the flange portion 382 constituted of the first resin can be prevented from abutting the lower surface of the cutting blade 44. That is, it is ensured that the first main body 378 constituted of the first resin is prevented from abutting the lower surface of the cutting blade 44. Thus, it is ensured that the clank is reduced while the cutting blade 44 is rotating.

(Correspondence Relationship) The inner cylindrical portion 380 is an example of "cylindrical portion".

Fourth Embodiment

Referring to FIG. 7, a grounding body 446 of a fourth embodiment will be described. The grounding body 446 comprises the mounting part 70 and a main body 472. The main body 472 comprises a grounding part 474 configured to contact the ground P1, an inner main body 476 and an abutting part 478. The grounding part 474 and the inner main body 476 are integrally formed. The grounding part 474 and the inner main body 476 are formed by two-color molding. The abutting part 478 is configured separately from the grounding part 474 and the inner main body 476. The abutting part 478 is, for example, a rubber O-ring and is constituted of a resin that is more elastically deformable than the grounding part 474 and the inner main body 476. For example, the abutting part 478 has a smaller Young's modulus than the grounding part 474 and the inner main body 476.

The grounding part 474 comprises an inner cylindrical portion 480 and a flange portion 482. The inner cylindrical portion 480 has the same shape as that of the inner cylindrical portion 280 of the second embodiment (see FIG. 5). The flange portion 482 comprises a curve portion 486 extending radially outward from a lower end of the inner cylindrical portion 480 and an outer cylindrical portion 488 extending upward from an outer edge of the curve portion 486. The curve portion 486 has the same shape as that of the curve portion 286 of the second embodiment (see FIG. 5). A first recess 490 that is downwardly recessed is defined in an upper surface of the curve portion 486. A lower end 490a of the first recess 490 is positioned below the lower end 52b of the cutting blade shaft 52 and the lower end 60a of the nut member 60. A second recess 492 that is downwardly recessed is defined in an upper surface of the outer cylindrical portion 488. The abutting part 478 is disposed in the second recess 492. An upper end of the abutting part 478 is positioned above the upper end of the outer cylindrical portion 488. In the state where the grounding body 446 is mounted on the cutting blade shaft 52, a space S1 exists between the upper end of the outer cylindrical portion 488 and the lower surface of the cutting blade 44. The upper end of the abutting part 478 contacts the lower surface of the cutting blade 44.

The inner main body 476 has the same shape as that of the second main body 279 of the second embodiment (see FIG. 5). The inner main body 476 is disposed on an inner surface of the grounding part 474 (specifically, an outer surface of the inner cylindrical portion 480, an upper surface of the curve portion 486 and an inner surface of the outer cylindrical portion 488). Besides, the inner main body 476 is disposed in the first recess 490. A lower end 476a of the inner main body 476 is positioned below the lower end 52b of the cutting blade shaft 52 and the lower end 60a of the nut member 60. Additionally, a lower end 474a of the grounding part 474 is positioned below the lower end 476a of the inner main body 476.

In one or more embodiments, the main body 472 comprises the grounding part 474 (an example of "first main body"), the inner main body 476 (an example of "second main body"), and the abutting part 478 (an example of "third main body"). The material quality of the abutting part 478 is different from those of the grounding part 474 and the inner main body 476. The abutting part 478 is more elastically deformable than the grounding part 474 and the inner main body 476. The abutting part 478 abuts the lower surface of the cutting blade 44. According to this configuration, the abutting part 478 constituted of a third resin, which is more elastically deformable than the grounding part 474 and the inner main body 476, abuts the lower surface of the cutting blade 44. The clank can thus be reduced while the grass cutter 2 is working. Consequently, the quietness of the grass cutter 2 is improved.

In one or more embodiments, the grounding part 474 comprises the inner cylindrical portion 480 (an example of "cylindrical portion") and the flange portion 482. The abutting part 478 is disposed on an upper surface of the flange portion 482. According to this configuration, the upper surface of the flange portion 482 constituted of the first resin can be prevented from abutting the lower surface of the cutting blade 44. That is, it is ensured that the grounding part 474 constituted of the first resin is prevented from abutting the lower surface of the cutting blade 44. Thus, it is ensured that the clank is reduced while the cutting blade 44 is rotating.

In one or more embodiments, the abutting part 478 is configured separately from the grounding part 474 and the inner main body 476. The second recess 492 (an example of "recess") having a downwardly recessed shape is defined in the upper surface of the flange portion 482. The abutting part 478 is disposed in the second recess 492. The upper end of the abutting part 478 is positioned above the upper end of the flange portion 482. According to this configuration, the abutting part 478 is disposed in the second recess 492 defined in the upper surface of the flange portion 482. Thus, the abutting part 478 can be prevented from separating from the upper surface of the flange portion 482 while the cutting blade 44 is rotating, without fixing the abutting part 478 to the upper surface of the flange portion 482 by adhesion, welding and/or other method(s). Consequently, the structure of the main body 472 can be simplified.

(First Variant) In the second embodiment shown in FIG. 5, the recess 290 may not be defined in the upper surface of the curve portion 286 of the first main body 278. In this variant, the upper surface of the curve portion 286 may be positioned below the lower end 52b of the cutting blade shaft 52 and the lower end 60a of the nut member 60. Thus, the lower end 279a of the second main body 279, which is disposed on the inner surface of the flange portion 282 (i.e., the outer surface of the inner cylindrical portion 280, the upper surface of the curve portion 286 and the inner surface of the outer cylindrical portion 288), is positioned below the lower end 52b of the cutting blade shaft 52 and the lower end 60a of the nut member 60.

(Second Variant) In the third embodiment shown in FIG. 6, the second main body 379, instead of the first main body 378, may comprise a flange portion. In this variant, an upper surface of the flange portion constituted of the second resin abuts the lower surface of the cutting blade 44.

(Third Variant) In the third embodiment shown in FIG. 6, the second main body 379 may be disposed only on the upper surface of the flange portion 382 (specifically, the upper surface of the outer cylindrical portion 388). That is, the second main body 379 may not be disposed on the inner surface of the flange portion 382 (specifically, the inner surface of the curve portion 386).

(Fourth Variant) In the first embodiment shown in FIG. 1 to FIG. 4, the first main body 78 may be configured separately from the second main body 79. Besides, in the second embodiment shown in FIG. 5, the first main body 278 may be configured separately from the second main body 279. Additionally, in the third embodiment shown in FIG. 6, the first main body 378 may be configured separately from the second main body 379.

(Fifth Variant) In the fourth embodiment shown in FIG. 7, the main body 472 comprises the grounding part 474 and the abutting part 478, but may not comprise the inner main body 476. In this variant, the grounding part 474 and the abutting part 478 are respectively examples of "first main body" and "second main body". This configuration can reduce the clank while the grass cutter 2 is working and improve the quietness of the grass cutter 2 as well.

What is claimed is:

1. A grounding body mounted on a cutting blade shaft of a grass cutter, the grounding body comprising:
    a mounting part for mounting the grounding body on the cutting blade shaft, wherein a cutting blade is mounted on the cutting blade shaft to be positioned above the grounding body; and
    a main body coupled to the mounting part and configured to contact a ground, wherein the main body comprises:
    a first main body constituted of a first resin; and
    a second main body constituted of a second resin different from the first resin, wherein
    the grounding body is mounted on the cutting blade shaft by a nut member,
    the mounting part comprises a through hole through which the cutting blade shaft passes,
    a color of the first resin is different from a color of the second resin,
    a lower end of the second main body is positioned below a lower end of the cutting blade shaft and a lower end of the nut member, and
    a lower end of the first main body is positioned below the lower end of the second main body.

2. The grounding body according to claim 1, wherein
    an outer surface of the first main body is configured to contact the ground, and
    the second main body is disposed on an inner surface of the first main body.

3. The grounding body according to claim 2, wherein
    a recess is defined in the inner surface of the first main body, a lower end of the recess is positioned below the lower end of the cutting blade shaft and the lower end of the nut member, and the second main body is disposed in the recess.

4. The grounding body according to claim 1, wherein the second main body is disposed on an upper surface of the first main body.

5. The grounding body according to claim 1, wherein the main body further comprises a third main body constituted of a third resin different from the first resin and the second resin, the third resin is more elastically deformable than the first resin and the second resin, and the third main body abuts a lower surface of the cutting blade.

6. The grounding body according to claim 5, wherein the first main body comprises:
a cylindrical portion coupled to the mounting part; and
a flange portion extending radially outward from a lower end of the cylindrical portion, and
the third main body is disposed on an upper surface of the flange portion.

7. The grounding body according to claim 6, wherein the third main body is configured separately from the first main body and the second main body,
a recess having a downwardly recessed shape is defined in an upper surface of the flange portion,
the third main body is disposed in the recess, and
an upper end of the third main body is positioned above an upper end of the flange portion.

8. The grounding body according to claim 1, wherein the second resin is more elastically deformable than the first resin, and
the second main body abuts a lower surface of the cutting blade.

9. The grounding body according to claim 8, wherein the first main body comprises:
a cylindrical portion coupled to the mounting part; and
a flange portion extending radially outward from a lower end of the cylindrical portion, and
the second main body is disposed on an upper surface of the flange portion.

10. The grounding body according to claim 9, wherein the second main body is disposed on an inner surface of the flange portion.

11. A grass cutter comprising:
an operation rod;
a cutting blade shaft disposed on a front portion of the operation rod;
a cutting blade mounted on the cutting blade shaft; and
a grounding body mounted on the cutting blade shaft and configured to contact a ground, wherein the cutting blade is positioned above the grounding body,
wherein
the grounding body comprises:
a mounting part for mounting the grounding body on the cutting blade shaft; and
a main body coupled to the mounting part and configured to contact the ground,
the main body comprises:
a first main body constituted of a first resin; and
a second main body constituted of a second resin different from the first resin, wherein
the grounding body is mounted on the cutting blade shaft by a nut member,
the mounting part comprises a through hole through which the cutting blade shaft passes,
a color of the first resin is different from a color of the second resin,
a lower end of the second main body is positioned below a lower end of the cutting blade shaft and a lower end of the nut member, and
a lower end of the first main body is positioned below the lower end of the second main body.

* * * * *